United States Patent
Hughes et al.

(10) Patent No.: US 11,143,495 B2
(45) Date of Patent: Oct. 12, 2021

(54) THICKNESS MEASUREMENT WITH INDUCTIVE AND OPTICAL DISPLACEMENT SENSORS

(71) Applicant: HONEYWELL INTERNATIONAL INC., Morris Plains, NJ (US)

(72) Inventors: Michael Kon Yew Hughes, Vancouver (CA); Sebastien Tixier, North Vancouver (CA); Tobias Nebel, North Vancouver (CA)

(73) Assignee: Honeywell International Inc., Charlotte, NC (US)

( * ) Notice: Subject to any disclaimer, the term of this patent is extended or adjusted under 35 U.S.C. 154(b) by 19 days.

(21) Appl. No.: 16/569,214

(22) Filed: Sep. 12, 2019

(65) Prior Publication Data

US 2020/0096308 A1 Mar. 26, 2020

Related U.S. Application Data

(60) Provisional application No. 62/735,583, filed on Sep. 24, 2018.

(51) Int. Cl.
*G01B 7/06* (2006.01)
*G01B 11/06* (2006.01)

(52) U.S. Cl.
CPC .............. *G01B 7/105* (2013.01); *G01B 7/06* (2013.01); *G01B 11/0616* (2013.01)

(58) Field of Classification Search
CPC ... H01L 2924/30107; H01L 2924/3011; H01L 2924/3025; H01L 21/32115; H01L 21/3212; H01L 21/2885; H01L 22/26; H01L 21/4857; H01L 21/67253; H01L 22/12; H01L 21/02068; G01B 11/0625; G01B 11/06; G01B 11/0616;

(Continued)

(56) References Cited

U.S. PATENT DOCUMENTS 4,977,853 A * 12/1990 Falcoff .................. G01B 7/023
  118/665
5,328,517 A * 7/1994 Cates .................... B08B 7/0035
  134/1

(Continued)

OTHER PUBLICATIONS

Danon, Yaron et al., "Characterizing Tantalum Sputtered Coatings on Steel by Using Eddy Currents," IEEE Transactions on Magnetics, Jul. 2004, pp. 1826-1832, vol. 40, No. 4, IEEE.

*Primary Examiner* — Vinh P Nguyen
(74) *Attorney, Agent, or Firm* — Jetter & Associates, P.A.; Neil R. Jetter

(57) ABSTRACT

A sensor system includes an eddy current sensor including at least one coil with excitation electronics coupled across the coil. An optical displacement sensor is secured to the eddy current sensor so that a vertical distance between the sensors is fixed. The optical displacement sensor is located on top of and concentric with the coil so that a measurement axis of the optical displacement sensor is collinear with an axis of symmetry of the coil. A computing device including a processor and memory is coupled to receive sensor data from the eddy current sensor and the optical displacement sensor that is adapted for analyzing the sensor data obtained from measuring a coated substrate including a coating layer on at least one side of a metal substrate to determine at least a thickness of the coating layer.

7 Claims, 5 Drawing Sheets

(58) Field of Classification Search
CPC .............. G01B 11/0658; G01B 21/085; G01B 11/0608; G01B 11/0633; G01B 11/0683; G01B 11/2513; G01B 2210/44; G01B 5/066; G01B 7/06; G01B 7/105; G01N 27/82; G01N 21/3581; G01N 2021/8427; G01N 27/023; G01N 27/9046; B24B 37/04; B24B 37/20; B24B 37/013; B24B 37/042; B24B 49/105; G01R 33/0354; G01R 33/286

See application file for complete search history.

(56) References Cited

U.S. PATENT DOCUMENTS

| | | | |
|---|---|---|---|
| 5,355,083 A | 10/1994 | George et al. | |
| 5,781,008 A | 7/1998 | Muller et al. | |
| 6,288,536 B1* | 9/2001 | Mandl | G01D 3/0365 324/207.12 |
| 6,700,370 B2* | 3/2004 | Chen | G01B 7/085 324/226 |
| 6,966,816 B2* | 11/2005 | Swedek | B24B 37/013 324/230 |
| 7,042,558 B1* | 5/2006 | Sarfaty | G01B 7/105 324/244.1 |
| 8,691,323 B2* | 4/2014 | Von Drasek | B31F 1/14 427/10 |
| 8,760,669 B2* | 6/2014 | Heath | G01B 11/06 356/630 |
| 9,266,694 B2 | 2/2016 | Shakespeare et al. | |
| 2003/0090266 A1 | 5/2003 | Kesil et al. | |
| 2013/0083332 A1 | 4/2013 | Heath et al. | |

\* cited by examiner

THICKNESS MEASUREMENT WITH INDUCTIVE AND OPTICAL DISPLACEMENT SENSORS

CROSS-REFERENCE TO RELATED APPLICATIONS

This application claims the benefit of Provisional Application Ser. No. 62/735,583 entitled "MEASUREMENT SYSTEM WITH INDUCTIVE AND OPTICAL DISPLACEMENT SENSORS," filed Sep. 24, 2018, which is herein incorporated by reference in its entirety.

FIELD

Disclosed embodiments relate to measuring the thickness of a coating on a metal foil.

BACKGROUND

Eddy currents, also called Foucault currents, are loops of electrical current induced within an electrical conductor by a time-varying magnetic field. A current flowing in a conductor, such as flowing in a wire of a coil, generates a magnetic field, while a time-varying current generates a time-varying magnetic field (referred to as an originating magnetic field for eddy current sensing) which induces an eddy current flowing within an electrically conductive sheet (conductor), where the resulting eddy currents in the conductor oppose those of the originating magnetic field. Pulsed eddy currents are used for measuring the thickness of an electrically conductive layer, as well as the thickness of a coated substrate comprising an electrically conductive coating layer on an electrically conductive substrate.

Lithium-ion batteries utilize coated substrates for the anode and cathode electrodes. The process of manufacturing lithium-ion batteries generally begins by mixing an electrochemical slurry comprising a graphite compound for the anode and a lithium-metal-oxide compound for the cathode which acts as electron collector during the ion flow within the battery cell. This slurry is then spread evenly onto metallic foils to form the electrodes, commonly through a process generally called slot die coating. The substrate for the electrodes in lithium-ion batteries generally comprise copper foil (for the anode) and aluminum foil (for the cathode). After the metal substrate has been evenly coated with the slurry, the coated substrate is put into an oven to dry the slurry. Once the anode and cathode have been dried to form electrodes, each electrode is compressed to a desired thickness between calender rolls. To form a battery, a separator is placed between the anode and cathode inside a metal container, electrolyte is added, and the electrodes are electrically connected to leads.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize known pulsed eddy current methods for measuring the thickness of a coated substrate comprising an electrically conductive coating layer on an electrically conducting substrate (e.g., an electrode coating on at least one side of a metal foil for the electrodes for lithium ion battery applications) have problems including complicated calibrations, lack of needed accuracy, and slow measurements due to the complicated calculations involved. Furthermore, known pulsed eddy current methods generally require that the electrode to be in physical contact with the coil. To measure the coating thickness, the coating side is generally positioned up against the coil, thus being held in physical contact with the measurement coil, or alternatively to being physically contacted being at a known, the electrode can be at a fixed distance from the coil.

One disclosed embodiment comprises a sensor system comprising an eddy current sensor (also known in the art as an inductive z-sensor) including at least one coil with excitation electronics coupled across the coil. An optical displacement sensor is on top of (above) and is concentric with the eddy current sensor so that a vertical distance between the eddy current sensor and optical displacement sensor is a fixed distance. The vertical distance between the sensors can be known, or can be determined during a sensor system calibration. A computing device including a processor with an associated memory is coupled to receive sensor data from the eddy current sensor and from the optical displacement sensor. The computing device is for measuring a coated substrate comprising a coating layer on at least one side of a metal substrate by analyzing sensor data to determine at least a thickness of the coating layer.

DETAILED DESCRIPTION

Figure 1:
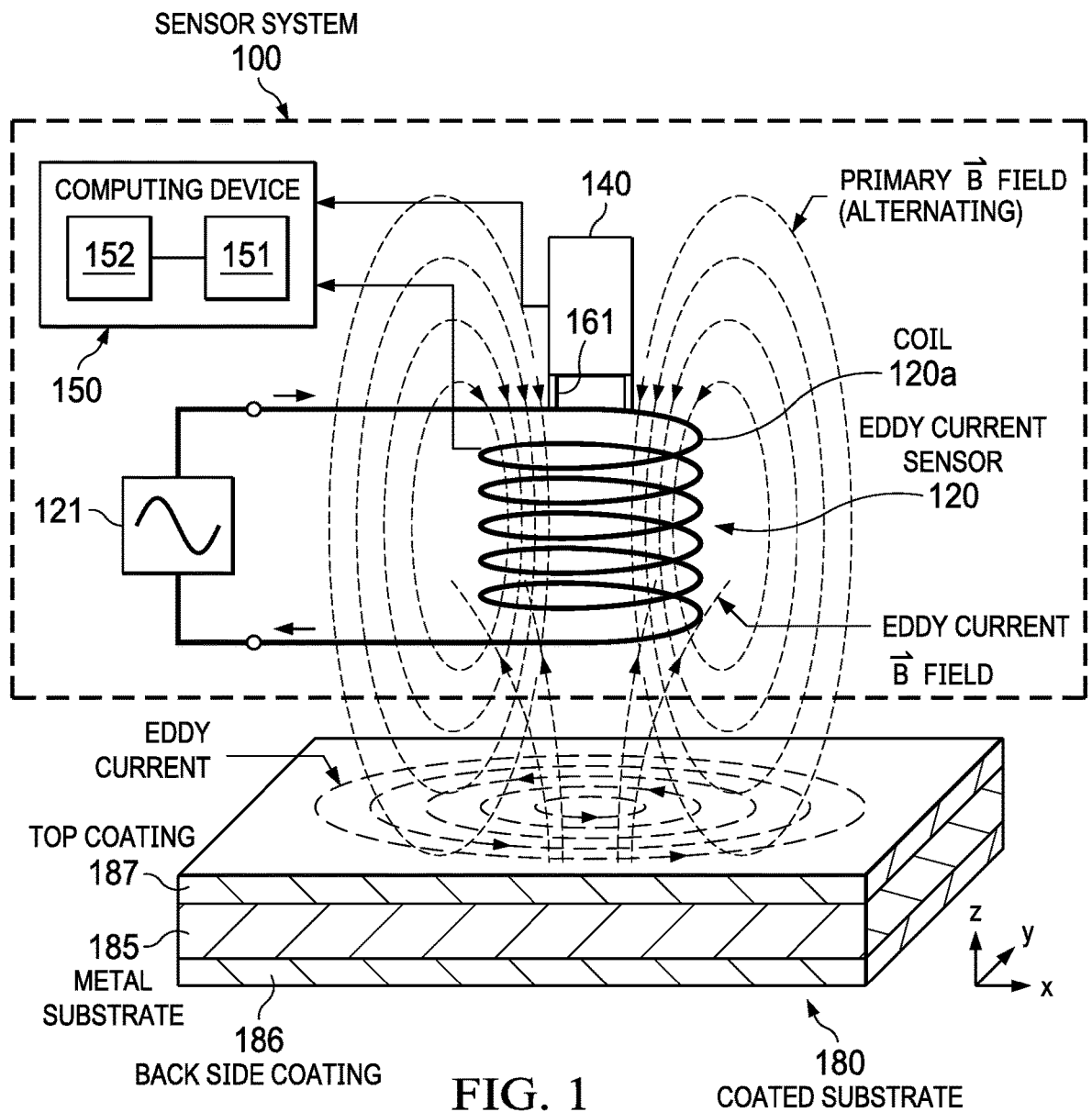
FIG. 1 shows an enhanced perspective top view depiction of a disclosed sensor system for measuring the thickness of a coated substrate comprising an electrically conductive coating layer (e.g., an electrode coating) on an electrically conducting substrate (e.g., metal foil), where the sensor system includes an optical displacement sensor and an eddy current sensor.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

FIG. 1 shows an enhanced perspective top view depiction of a disclosed sensor system 100 for measuring the thickness of an electrically conductive coating layer (e.g., an electrode coating) on an electrically conducting substrate, where the sensor system 100 includes at least one optical displacement sensor 140 and at least one eddy current sensor 120 comprising at least one coil 120a. The optical displacement sensor 140 is located on top of and concentric with the coil 120a so that a measurement axis of the optical displacement sensor 140 is collinear with an axis of symmetry of the coil 120a. A coated substrate 180 is shown comprising a metal substrate generally comprising a metal foil 185 that has a coating thereon on at least one side shown as a top coating 187 and a back side coating 186.

The optical displacement sensor 140 is on top of and concentric with the coil 120a. By concentric it is meant that the measurement axis of the optical displacement sensor 140 is collinear with the axis of symmetry of the coil 120a. In some cases, the coil may not be circular shaped as shown in FIG. 1, such as being shaped oval or some other shape. If the coil 120a is shaped oval, the eddy current measurement will have better spatial resolution in the shorter axis dimension). The eddy current sensor 120 can be configured with a single coil 120a as shown in FIG. 1, or the eddy current sensor can be realized with two coils comprising a separate excitation coil that receives the excitation signal and a so-called pickup coil that receives the magnetic field generated by the eddy current induced to flow in the coated substrate 180.

There is an attachment structure 161 for fixing (holding constant) the vertical (z-axis) distance between a reference plane of the optical displacement sensor 140 and a reference plane of the coil 120a of the eddy current sensor 120. The coil 120a is physically attached to attachment structure, typically as known in the art being wound around a coil form which provides the coil 120a mechanical stability. The coil form generally comprises a dielectric material (typically a ceramic) form to have a hollow center. In practice the coil form extends vertically beyond the coil (including above the coil 120a) and can have threaded screw holes so that the optical displacement sensor 140 can be screwed into the coil form to be positioned at a fixed distance above the top of the coil 120a. Coil forms are commonly used to hold a specified number of turns of the coil on a specified diameter former. The coil form may or may not be used in conjunction with a coil form "tuning slug". A tuning slug in a coil form leads to greater inductance with fewer turns of the coil 120a.

The sensor system 100 includes excitation electronics 121 that is shown coupled across the coil 120a. The excitation electronics 121 generally comprises a pulsed current source rather than a pulsed voltage source. One generally wants the magnetic field generated by the coil 120a to be the same, and that can be controlled by keeping the current through the coil 120a the same. The voltage needed to maintain the same current in the coil 120a will change with the arrangement of conductors near the coil 120a due to mutual inductance.

As noted above the coil 120a will generally be wound around a coil form that generally comprises a dielectric material. This coil form feature is shown generally in FIG. 1 as an attachment structure 161. A coil form will provide mechanical stability to the sensor system arrangement. To enhance the dimensional stability and stability of the electrical properties of the coil 120a, the coil 120a may be thermally stabilized.

It may be desirable to make the coil form out of a material such as sintered $Al_2O_3$ which has good mechanical stability and good thermal conductivity while being a good electrical insulator. The accuracy of the eddy current measurement improves the closer the coil 120a can be to the electrode (~5 mm range is generally easily achievable). Additionally, the spatial resolution will improve the smaller the coil 120a can be. Accurate optical displacement sensors 140 will typically have a range of 25 to 30 mm. Therefore, the optical displacement sensor 140 is usually placed above the coil 120a as shown in FIG. 1. Generally, these measurements will be co-linear as one is trying to measure the properties of a representative patch along this line. It is recognized that the measurement area of the coil 120a is larger than that of the optical displacement sensor 140.

Figure 2A:
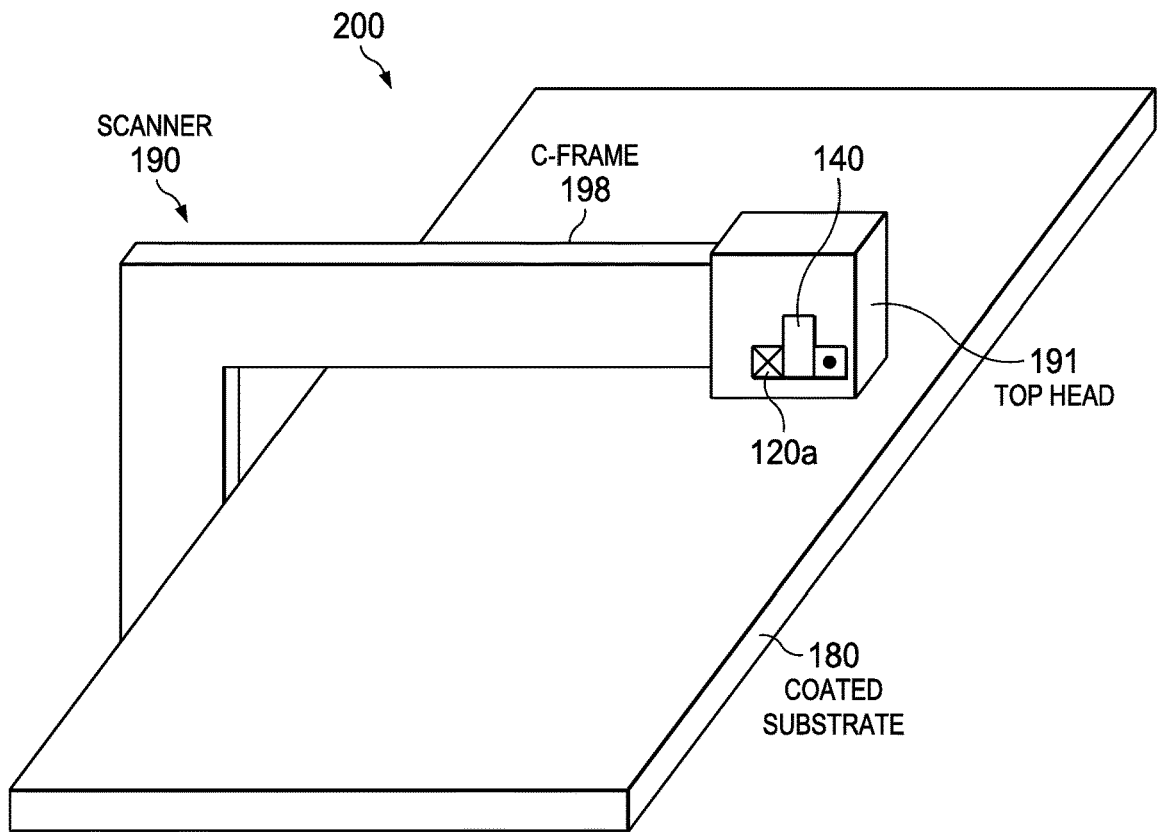
FIG. 2A shows a top perspective view of an example sensor system for measuring the thickness of a coated substrate that further comprises a scanner shown as a C-frame including a translation mechanism, where the eddy current sensor and the optical displacement sensor are contained within the scanner.
Figure 2B:
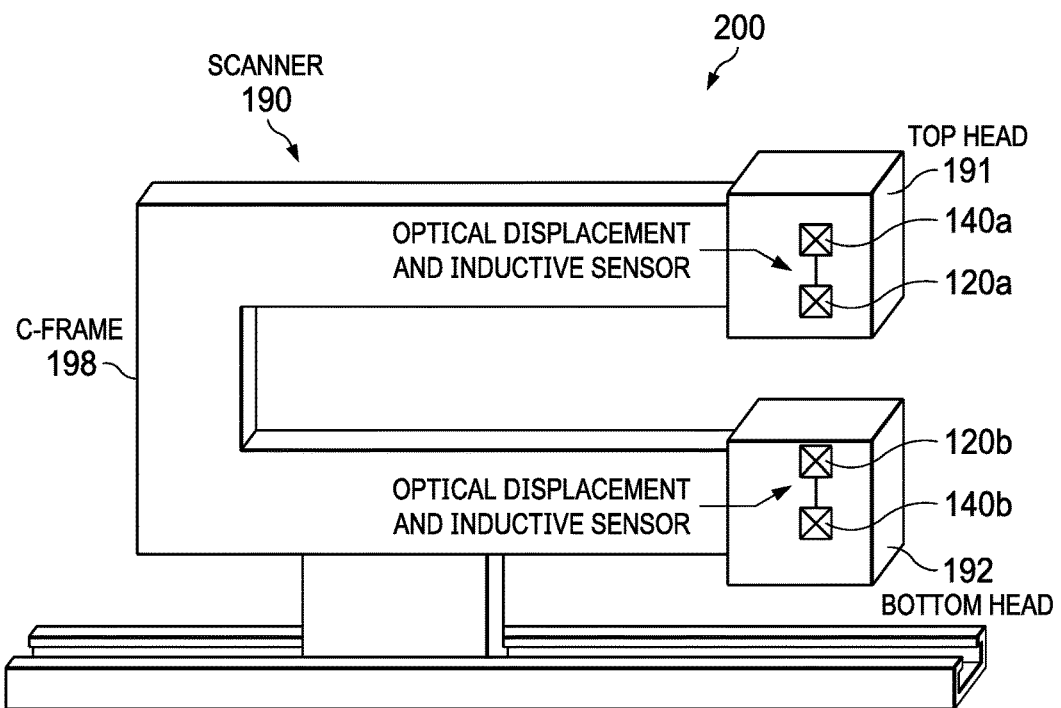
FIG. 2B shows a more detailed view of a scanner showing a top head and a bottom head, and a translation mechanism shown as a translation stage configured for scanning the C-frame. In this arrangement both the top head and the bottom head include an optical displacement sensor and an eddy current sensor.

However, one is generally interested in average and representative measurements. Therefore, averaging is done spatially with the electrode movement and by using a scanner such as shown in FIG. 2A and FIG. 2B described below for scanning the optical displacement sensor 140 and the eddy current sensor 120 across the coated substrate that can comprise an electrode sheet.

The optical displacement sensor 140 that can comprise a laser triangulation sensor, or another type of displacement sensor, such as a chromatic confocal displacement sensor. The excitation electronics 121 such as a current source may be more than a current source, to enable it to measure the complex impedance (both the magnitude and phase of the impedance). Alternatively, these functions can be separated, so the excitation electronics 121 can excite a primary coil functioning as a current source, and a separate box having a computing device and a secondary coil can measure the response from the coated substrate (e.g. electrode) electrode in a measurement equivalent to the impedance and phase measurement, a measurement of voltage or current, and the phase.

The sensor system 100 can accurately measure the thickness of an electrode coating on at least one side of a metal substrate 185, enabled by the eddy current sensor 120, operated-for accurately measuring the z-position of the metal substrate (typically a 9 to 20 µm thick foil), where the coated substrate can be for a lithium-ion battery having an anode or cathode coating on a metal substrate 185. The electrode coating is typically about 75 µm thick, but can be up to 250 µm thick. The eddy current sensor 120 can optionally be operated as a pulsed sensor by the excitation electronics 121 configured to provide a suitable pulse signal.

In the production of lithium ion batteries, composite electrodes are first manufactured. As described in the background above, these electrodes are generally made by coating a metal foil substrate (usually aluminum or copper) with a coating. For example, the anode can comprise primarily graphite and the cathode can comprise a lithium metal oxide (e.g. $LiCoO_2$). Each of these electrode materials may have binders and conductivity enhancers added. A slurry is made of all the components which is then applied to the foil on one side or on both sides of the foil. The coating can then be dried and calendered. Producers of battery electrodes are interested in knowing the thickness of the anode or cathode coating in order to control this thickness. Additionally, producers of lithium battery electrodes may be interested in knowing not just the total electrode coating thickness of a double-sided coated metal substrate, but also the thickness of each of the sides of the electrode coating.

One way to measure the thickness of a coating on a metal substrate is to use the optical displacement sensor 140 shown in FIG. 1, collocated with an eddy current sensor 120 comprising at least one coil 120a. However, eddy current sensors normally operate at frequencies of or less than 1 MHz where the measurement skin depth is greater than 50 µm, but the thickness of the metal substrate when comprising a metal foil for a lithium battery is as noted above is generally less than 20 µm thick. When the skin depth is greater than the thickness of the metal foil the thickness measurements can be greatly affected by small variations in the metal foil thickness. In a test calculation of 17-µm thick copper foil measured with an eddy current sensor with a 40-mm-diameter coil at a measuring range of 13 mm, it was found that even a 1% variation of copper foil thickness leads to >10 µm changes in measured range leading to a >10 µm change in the calculated electrode coating thickness. This electrode coating thickness measurement error is large enough to likely be unacceptable to battery electrode producers. Disclosed aspects solve this problem by not assuming that the coating is non-electrically conducting, but instead by also taking the conductivity of the coating into account while calculating the distances to the metal substrate (foil) and to the surface of the coating (the electrode surface).

Aside from a measurement of caliper (thickness) for the electrode coating on a metal substrate, battery producers may also be interested in determining other product qualities such as the electrical conductivity of the electrode coating. An integrated electrical conductivity and thickness measurement is believed to be not currently available, which the sensor system 100 provides. The most commonly used known measurement techniques cannot measure a coating on each side of a metal foil individually.

As described above, the sensor system 100 is based on an optical displacement sensor 140 above a coil 120a of an outer positioned eddy current sensor 120 which are attached (typically using a coil form) to each other so that the distance along the z-axis (the vertical offset) between them is fixed. The range to the top surface of the coated substrate (electrode) can be measured by the optical displacement sensor 140, that is the range from a reference plane of the optical displacement sensor 140. Calibrations will be done with this arrangement and the sensor devices should not move with respect to each other for the calibrations to remain valid. The eddy current sensor provides a measurement which is a function of the thicknesses, electrical conductivities, and range to the electrode coating(s) 187 and 186, and the metal substrate 185, which as noted above can be a metal foil.

The optical displacement sensor 140 can comprise a diode-laser triangulation sensor. However, it is also possible to use other optical displacement sensor types. The optical displacement sensor 140, such as the triangulation device, is able to accurately measure the range (vertical distance) to the top surface of the electrode coating shown in FIG. 1 as the top coating 187. Commercial optical displacement sensor products are available which can make this range measurement to an accuracy of less than 1 µm (typically a 0.5 µm 2 standard deviation ($2\sigma$)).

In one embodiment, a conventional eddy current sensor is used in which a single frequency from the excitation electronics 121 is used to excite a coil 120a that can comprise a multi-turn coil, and the response of the coated substrate 180 is monitored either on the same coil 120a used for the excitation or on a nearly coincident secondary coil. The response phase and magnitude can be measured. The excitation frequency used will generally be in the range of 50 kHz to 1,000 kHz (1 MHz).

In another embodiment, if more information about the coated substrate 180 than just the coating layer thickness is desired, such as the electrical conductivity of the coated substrate 180, a pulsed eddy current technique can be employed. A repetitive pulsed signal such as a square wave pulse voltage may be applied to a coil 120a of an eddy current sensor by excitation electronics 121 (e.g., a pulse duration of 5 to 15 µseconds) and the response of the coated substrate 180 is then measured by the coil 120a or by another coil, generally with an Analog-to-Digital-Converter (ADC) coupled to the coil 120a or another coil, where the ADC has its output coupled to a processor 151 of the computing device 150 shown in FIG. 1.

The reception of the response function for the eddy current sensor can be at the primary coil that also provides the magnetic field to the electrode coated metal foil, or at a secondary (pickup) coil that may also be used to receive the response function. Alternatively, instead of applying square wave pulses, it is also possible for the excitation electronics 121 to apply a swept frequency to the primary coil and measuring the response as a function of the frequency. To obtain the coating layer thicknesses, calculations are generally made with a processor 151 such as a microprocessor having associated memory 152, shown as a computing device 150 in FIG. 1. The measured response is a function of the range to the electrode and the thickness and electrical conductivity of each layer (e.g., top coating 187 and the metal substrate 185).

It is possible to determine a number of different parameters from the measured results. It is expected that because if one tries to extract all these parameters from the sensor data the result will have low accuracy for any individual parameter. Therefore, a fit can be performed within a range of expected values, and an optical displacement sensor 140 such as a laser triangulation device can be used to provide a range (distance) to the top surface of the coating layer shown as top coating 187 in FIG. 1. It is also expected that the electrical conductivity of the metal substrate 185 that may comprise a metal foil material will be well-known (e.g., the bulk electrical conductivity of copper is well known), or can be determined prior to disclosed thickness measurements. It should also be noted that due to the generally relatively thin metal foils for the metal substrate 185, the back side coating 186 may need to be taken into account in the thickness calculations. It is also noted a main novelty of this disclosed aspect is the use of an optical displacement sensor 140 to determine the range to the electrode coating meaning that the known art generally employs a fixed standoff whereas in disclosed systems the coated substrate generally in the form of a sheet is allowed to move in the z-direction, that is the range from the eddy current sensor to the top surface of the electrode (the coating) that does not have to be kept constant, and one measures its range (standoff) with respect to the optical displacement sensor 140.

One approach to calculating the desired parameters (specifically the coating layer 187 and 186 thicknesses) but also the electrical conductivity of the coated substrate 180, is to fit the measured waveform to the expected results using a least-squares method. However, instead of doing a detailed comparison to theory, most of the needed information can generally be obtained by simple waveform measurements (e.g., peak, peak timing, and zero crossing time) which can be compared to a three-dimensional look-up table based on theoretical calculations. This can significantly speed up the thickness calculation times.

What is generally important for making an accurate thickness measurement for coating layers including for at least a top coating 187 on a metal substrate 185 is generally that there be a significant difference in the electrical conductivities between the metal substrate 185 that generally comprises foil and the coating, such as the top coating 187. This should not be a difficulty as metal foil substrates generally have very high relative electrical conductivities and the electrode coatings generally do not have electrical conductivities much greater than graphite. It is therefore likely that there is generally at least a 500 times difference in these electrical conductivities. In the limit of low electrode coating layer electrical conductivity, the eddy current measurement would thus essentially be that of the underlying metal foil and the measurement would be a combination of the optical displacement sensor 140 measurement to the top surface of the top coating 187 and an inductive measurement from the eddy current sensor 120 to the top surface of the metal substrate 185 that as described above generally comprises a metal foil.

As described above, the eddy current sensor 120 is generally mechanically coupled to the optical displacement sensor 140 by the attachment structure 161, and the projected laser beam from the optical displacement sensor 140 is concentric with the coil 120a of the eddy current sensor 120. It is generally important that the height (z-axis) offset between the coil 120a of the eddy current sensor 120 and the optical displacement sensor 140 be fixed. To ensure this, the coil 120a of eddy current sensor 120 and the optical displacement sensor 140 are normally mechanically attached to each other by the attachment structure 161, and they may each even be temperature controlled. A μm of z-axis movement between the coil 120a of the eddy current sensor 120 and the optical displacement sensor 140 will generally lead to a μm range measurement error.

As noted above, the optical displacement sensor 140 measures the range to the top of the top coating electrode coating, and the inductive sensor indirectly measures ((calculated) ideally to the top of the metal substrate 185 generally comprising a metal foil. To measure to the top of the metal substrate 185 such as a metal foil, one generally needs to know the thickness of the metal substrate 185. However, because the electrode coating material is also electrically conductive, the eddy current sensor measurements—should generally take the electrical conductivity of the coating into account to enable being able to produce accurate readings of the electrode coating thickness. The sensor system 100 and method using this sensor system can make accurate (typically ~1 μm) measurements of the thickness of an electrically conductive coating on a metal substrate 185 comprising a thin metallic foil.

Disclosed sensor systems overcome the above-described problems when measuring the thickness of an electrically conductive coating on an electrically conducting substrate (such as electrode for a lithium-ion battery) by providing improved measurement accuracy and speed by rather than needing complicated multi-component curve fitting for every measurement, disclosed methods instead utilize relatively simple calculations, while generally enabling off-the-shelf hardware including respective Eddy current and optical displacement sensors and power supplies can be used.

FIG. 2A shows a top perspective view of an example sensor system 200 for measuring the thickness of a coated substrate that further comprises a scanner 190 shown as a C-frame including a translation mechanism (see the translation mechanism 195 in FIG. 2B described below), where the coil 120a of the eddy current sensor and the optical displacement sensor 140 are contained within a head shown as a top head 191 of the scanner 190.

FIG. 2B shows a more detailed view of a scanner 190 in the sensor system 200 showing a top head 191 and a bottom head 192, and a translation mechanism 195 shown as a translation stage configured for scanning the C-frame 198. There are known different ways of moving the C-frame 198 besides what is commonly known as a translation stage. In this arrangement both the top head 191 and the bottom head 192 both include an optical displacement sensor and an eddy current sensor shown as optical displacement sensor 140a and coil 120a in the top head 191 and optical displacement sensor 140b and coil 120b in the bottom head 192. The coil 120a of the eddy current sensor in the top head 191 and the coil 120b of the eddy current sensor in the bottom head 192 are generally operated at different frequencies to avoid interference between the two eddy current sensors.

It is now described how to use a disclosed system with a scanner such as the scanner 190 shown in FIGS. 2A and 2B. Sheet material producers, such as lithium battery producers, will generally always want to know the total caliper (thickness) of the product. And a double-sided optical measurement can produce that. One may use a scanning C-frame 198 because it is important that the optical measurements be well aligned to avoid error. With a C-frame 198, the top and bottom heads 191 192 are well aligned because they do not move independently. The whole C-frame scans the coated substrate 180 that is generally the form of a sheet as it is mounted on a translation mechanism 195 such as a translation stage.

One generally needs to know the distance between the top head 191 and the bottom head 192. This can be done with a mechanical design and periodic standardization against a known-thickness reference tile, or it can be measured (if one has a less-stiff frame) with a magnetic z-sensor such as Hall-effect, giant-magnetoresistance (GMR), or fluxgate sensor, also with periodic standardization.

Figure 3:
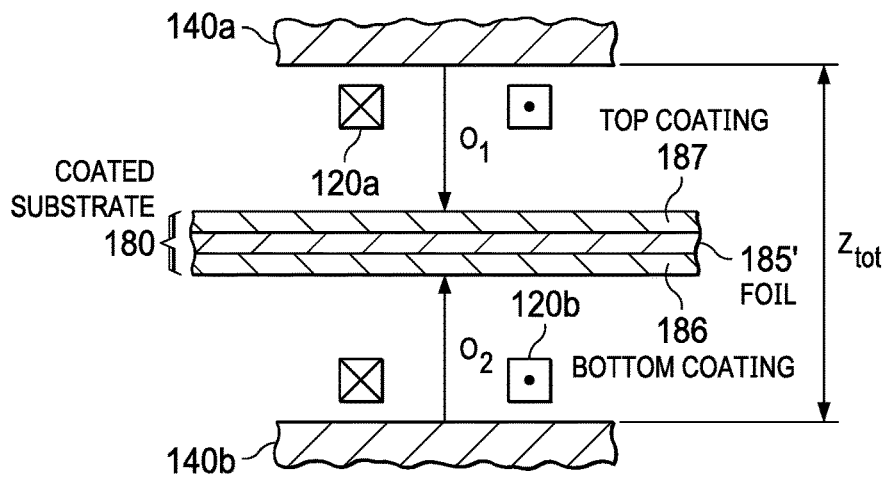
FIG. 3 depicts a coated substrate having coatings on both sides of a metal foil, with distances to sensors above and below the coated substrate shown.

FIG. 3 depicts a coated substrate 180 having coatings on both sides of a metal foil 185' shown as a top coating 187 and a bottom coating 186, with distances to the sensors above and below the coated substrate 180 shown along with an equation (the total thickness ($Z_{tot}$) of the coated substrate 180 being equal to $Z_{tot}-O_1-O_2$) for calculating the coating thicknesses. As described below, one can thus obtain the top coating 187 thickness and the metal foil 185' thickness from the eddy current sensor shown as the coil 120a combined with the $O_1$ distance calculated by the optical displacement sensor 140a.

For example, a C-frame can be provided such as shown in FIG. 2A and FIG. 2B as 198 which has dimensions not changed by more than about 0.1 μm as it scans the coated substrate (sheet). However, the dimensions of the C-frame may change with temperature. Therefore, periodically, for example every 20 minutes, one can use the sensor system to measure known thickness $t_k$, where $Z_{tot}=t_k+O_1+O_2$. By utilizing a sensor that can measure through the coated substrate, such as a Hall effect, GMR, or fluxgate sensor that is magnetically based that provides a coil in both a top head and in a bottom head of a scanner. If one knows the total thickness, and the thicknesses of the foil and the coating on one side then one can calculate the thickness of the coating on the other side. Alternatively, one can have two eddy current sensors and directly measure the thicknesses of the coatings on each side.

Figure 4A:
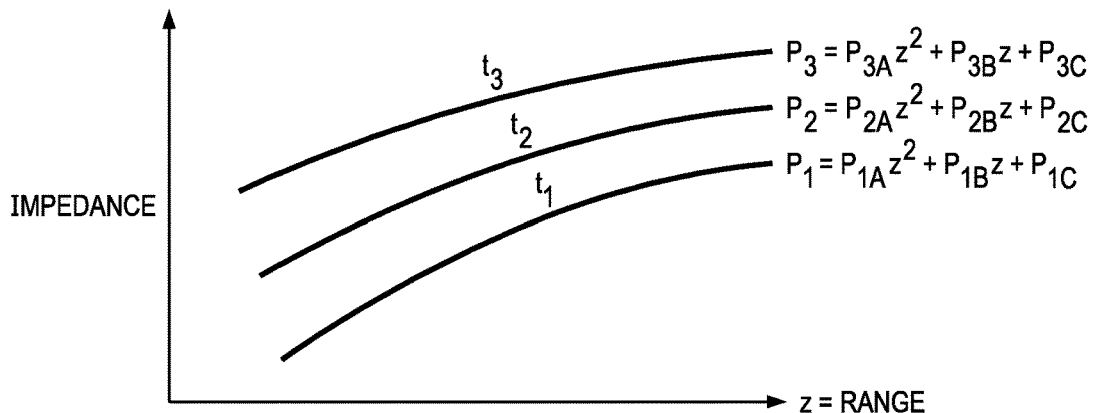
FIG. 4A shows a plot of impedance versus z-range for different coating thicknesses.

FIG. 4A shows a plot of impedance versus z-range for different coating thicknesses. The impedance values are provided by the eddy current sensor, and the z-range is provided by the optical displacement sensor 140. Curves are shown for different thicknesses of the foil shown as $t_1$, $t_2$ and $t_3$. As described below the terms $P_1$, $P_2$ and $P_3$ are polynomials. $P_1$ as used herein is $P_{1A}$, $P_{1B}$, $P_{1C}$ and then the Impedance=$P_1(z)=P_{1A} z^2 + P_{1B} z + P_{1C}$ when the full expression for the polynomial is written out.

Figure 4B:
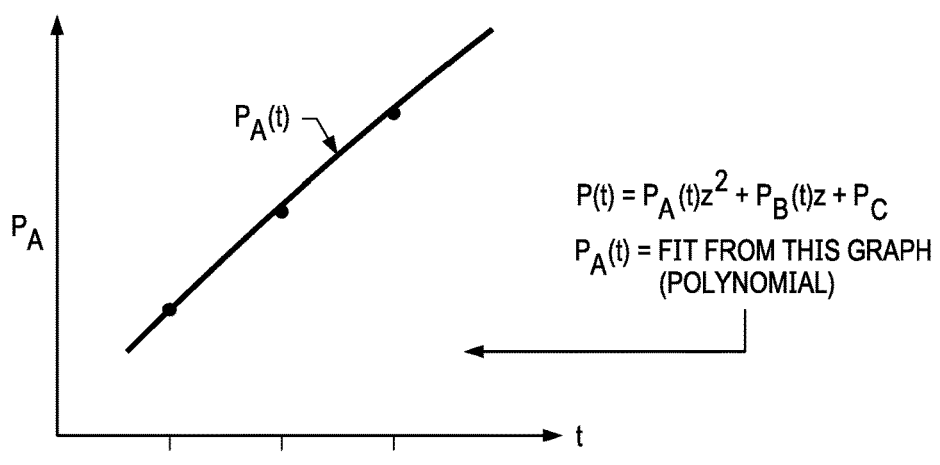
FIG. 4B shows a plot of Pa versus the coating thickness, where Pa is a number representing the first term of a polynomial.

FIG. 4B shows a plot of $P_A$ versus coating thickness showing data points at $t_1$, $t_2$ and $t_3$. As noted above, $P_A$ is the first term in a polynomial, and there could be constructed similar curves for $P_B$ and $P_C$.

Below is described a single frequency method of using a disclosed sensor system comprising eddy current sensor 120 comprising at least one coil 120a and an optical displacement sensor 140 to measure the thickness of an electrically conductive coating layer shown as top coating 187 in FIG. 1 on a metal substrate 185 that can comprise an electrically conductive foil substrate. The eddy current sensor 120 measurement performed is made somewhat complex by generally needing to take into account the magnitude of the impedance as well as its phase. While it is possible to use only the magnitude if the thickness of the metal foil is constant, one generally needs to use the phase information to determine the metal foil's thickness.

To make a measurement using the sensor system 100, one generally first calibrates the respective eddy current sensor 120 and optical displacement sensor 140. For the optical displacement sensor 140, one can either use the manufacturer's calibration, or calibrate against a target at a known range such as calibrating against a target translated through the measurement range. The reference measurement can be provided by an interferometer or an optical encoder. The eddy current sensor calibration is a bit more difficult as the measurement of magnitude and phase of the impedance depends on not just the range to the measurement target (here the top coating 187 of the coated substrate 180), but also on the thickness of the relatively high electrical-conductivity metal substrate 185 that can comprise a metal foil.

The calibration can first be performed with the metal foil that for lithium battery applications can be used as the electrode current collector. That is, the coated substrate 180 sample can be placed parallel to the coil 120a of the eddy current sensor 120 and moved up and down throughout the measurement range while the coil 120a impedance (magnitude and phase) and range is recorded. The range (to the top of the top coating 187) can be measured with the optical displacement sensor 140, or another sensor such as a linear variable differential transformer (LVDT) which is also called linear variable displacement transformer mechanically in contact with the back surface of the electrode, can be used. If the optical displacement sensor 140 is used, it may be helpful to place a diffusely scattering material (such as pigmented and calendered vinyl) of known thickness on the otherwise secularly reflecting surface of the metal foil to obtain accurate range measurements.

Figure 5:
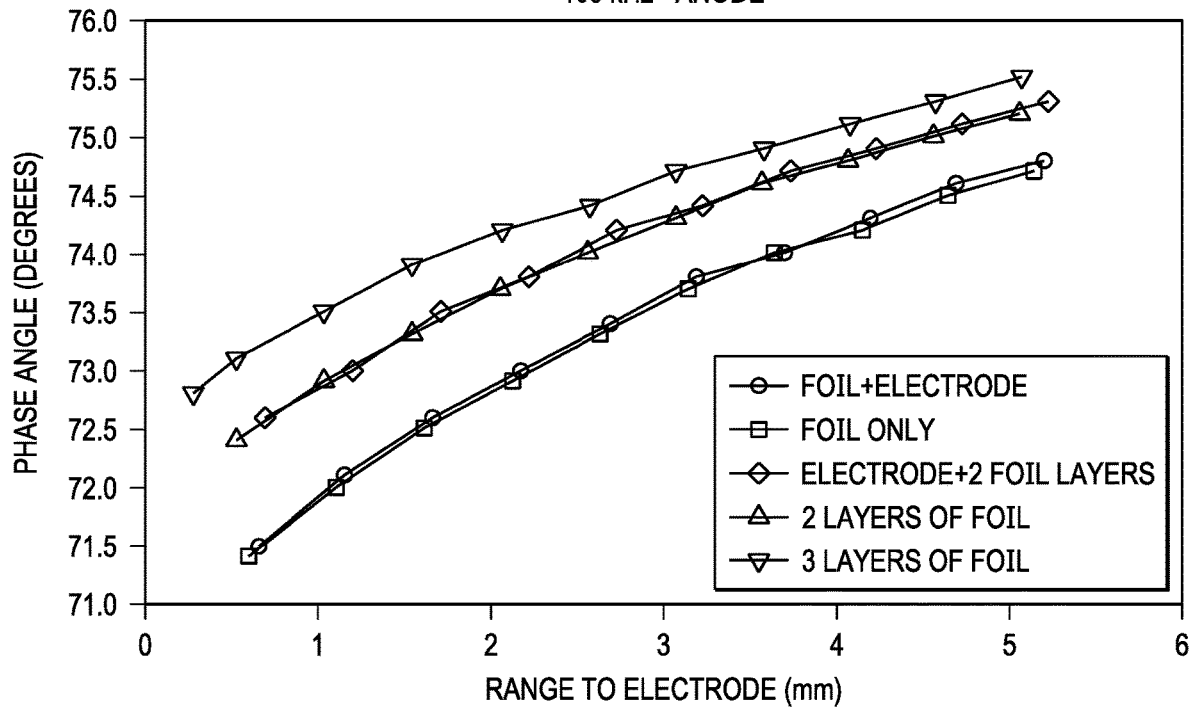
FIG. 5 shows the relative phase angle of an impedance at a 100 kHz (in degrees) vs. the range (distance) to an electrode coating (in mm) that is on a metal foil substrate using the sensor system shown in FIG. 1.

The measurements are then generally repeated with a second and third layer of metal foil. Alternatively, if finer gradations of metal foil of the correct composition are available, they should generally be used. At this stage, the most important information is shown in FIG. 5 which shows the phase angle (in degrees) as a function of range to the top coating 187 and the metal foil thickness.

It can be seen that this relationship is essentially entirely dependent on the thickness of metal foil substrate present rather than the thickness of the electrode coating. In this case, the metal foil/current collector comprised 10-μm thick copper. The measurement was made with an HP4277 LCZ meter that is a commercially available impedance measuring instrument and an MTI Instruments Microtrack 3 laser triangulation device as the optical displacement sensor 140. Since coated substrate samples with multiple thicknesses of the metal foil were not available, the effect by using an electrode sample and placing layers of foil of the same thickness behind it were simulated.

From the phase vs range data, one can make measurements of the range to the electrode (top coating) and phase angle to determine the foil thickness. A simple way to do this is to construct a polynomial which represents the phase as a function of the range. First a polynomial is fit to each phase vs range curve (for instance three curves if there are three different foil thicknesses and if it is a second order polynomial then there will be three components for each curve. In this case thickness 1 will be represented by a polynomial $P_1$, thickness 2 by $P_2$ etc. Each polynomial will have three terms as they are second order polynomials: $P_1=P_{1A}z^2+P_{1B}z+P_{1C}$. One can then construct a polynomial for an arbitrary thickness. One can do this by fitting a line or a curve to each of the terms in the polynomial. to illustrate this with a polynomial curve see FIG. 4B described below.

$P_A$ is thus the first term in the polynomial for an arbitrary thickness, t. One can put three points on this graph, $P_{A1}$, $P_{A2}$, and $P_{A3}$ on the y axis and the corresponding thicknesses on the x axis. One can make corresponding curves for $P_B$ and $P_C$. With this information, one can draw a phase vs range curve for any thickness (t). This is important because if one makes a measurement of range and phase, this will define a point on the 2D graph and one can then solve this family of equations to give a unique t which is the measured foil (metal substrate) thickness. It is noted in this above description is presented as phase vs. range where the y axis is labeled impedance vs. range, where the process is the same, just the label on the graph is different.

In a similar way, Impedance vs range to the bare-foil curves can be then generated for arbitrary metal foil thicknesses by fitting each impedance vs range curve to a polynomial (a second order polynomial is generally sufficient), and then interpolating between them the curves as a function of metal foil thickness. This calibration can be performed on-machine, or it can be performed in a factory or elsewhere, and can be stored in a memory of a computer device such as shown in FIG. 1, or on-board.

On-machine means at a production site where the foil thickness may change from time to time. If performed on-machine, then some sort of arrangement for precisely translating the coated substrate sample through the measurement range generally is constructed. If the coated substrate such as an electrode to be measured is double sided, the calibration should be performed with a single side coated electrode with a comparable foil thickness. The calibration of foil thicknesses should be done with the coating on the opposite side of the measurement. Similarly, additional foil layers can be added on top of the foil to calibrate for arbitrary foil thickness. This works because the coating on the back side of the electrode only has a small effect on the calibration. Small variations in the thickness of the back side coating do not significantly change the calibration results.

Next, measurements should generally be performed to determine the effect of the electrode coating. In the simplest case one can perform the same calibration procedure that was used for the metal foil but use a coated substrate 180 sample instead. The description below is for electrodes for lithium ion batteries. However, the disclosed technique applies to other similar products, such as electrodes for other battery types, or electrodes for fuel cells.

The procedure for disclosed thickness measuring for anodes and cathodes can be essentially the same. For the cathode it was found that the impedance measurement to the foil surface was insensitive to the amount of cathode coating. This is just because the cathode conductivity is generally lower as compared to the anode coating. Some published values are that the anode coating may have an electrical conductivity around $10^5$ S/m and the cathode coating may have a lower conductivity as compared to the anode of generally about ~1 S/m. In some cases, the cathode conductivity may be higher than 1 S/m, and if so then the procedure for anode thickness determination(s) can generally be used.

For the thickness measurement of a lithium-ion battery, the measurement then becomes relatively easy, with the optical displacement sensor 140 being used to measure the range to the top coating 187. The thickness of the metal substrate 185 which generally comprises a metal foil is calculated (if deemed needed) from the relation of the impedance phase to the range to the top coating 187. Then the range to the metal foil can be determined from the magnitude of the impedance. The thickness of the top electrode coating is simply a difference of these two values. It is noted that if the metal foil thickness varies, then there will be a family of such curves and the phase measurement can be used to determine which one to use.

For example, one can use a second order polynomial to represent calibrations of the metal foil as described above. Each metal foil thickness can have its own calibration curve (to clarify, there is a calibration curve for phase and one for impedance). It is relatively simple to then to construct a relationship to calculate a polynomial for any metal foil thickness (see the polynomial shown in FIG. 4A and FIG. 4B described above. In a simple case, one can just assume the relation is linear, or one can fit a curve to the thickness data to more accurately predict the curve for any metal foil thickness.

If the metal foil thickness is changing, one can first measure the thickness of the metal foil using the impedance phase information. Just as various thicknesses of foil produce a family of curves on the phase vs range plot, they will also produce a family of curves on the impedance vs range chart. The calibration on the impedance vs range chart can be represented as a polynomial which is the difference between the measurement with a known amount of coating and the measurement of the foil only. This can be added to a polynomial representing an arbitrary foil thickness to get the calibration curves for an arbitrary thickness of anode coating on an arbitrary foil thickness. Then from a family of calibration curves of impedance-magnitude from the eddy current sensor (to the laser voltage/displacement such as from the optical displacement sensor 140) one can compute a polynomial which represents the response of the measurement of the metal foil. It is noted that this technique generally only works for cathode coating layers of low electrical conductivity. For cathode layers with a higher conductivity, the procedure for the anode coating layer described below can be used.

Figure 6:
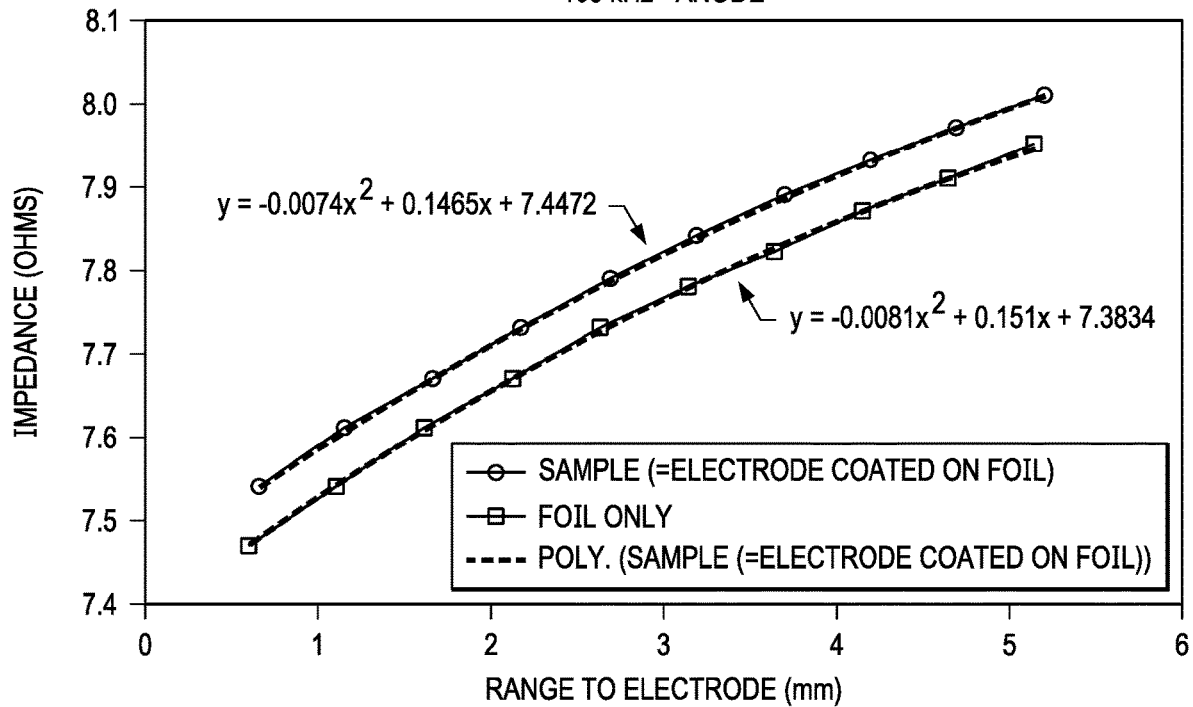
FIG. 6 shows the magnitude of impedance (in Ohms) at 100 kHz as a function of the range (distance) from the top of the electrode coating for the measurement system shown in FIG. 1.

For the anode coating layer, the measurement is a bit more complicated as the impedance curve shifts with the coating thickness. To deal with this, one can fit polynomials to a metal foil curve and to a foil plus electrode coating curve. It is noted that small corrections may need to be applied as the foil thickness will be reduced in the calendering process. It is thus possible that in the process of compressing the electrode structure, the foil may be thinned out as well as the coating. This is generally not a significant concern as there is disclosed a procedure to deal with changes to the foil thickness as described above. Such fits are shown in FIG. 6 where the range to the top of the electrode coating was measured with a laser-based optical displacement sensor 140. The impedance was again measured with a HP4277 LCZ meter.

Figure 7:
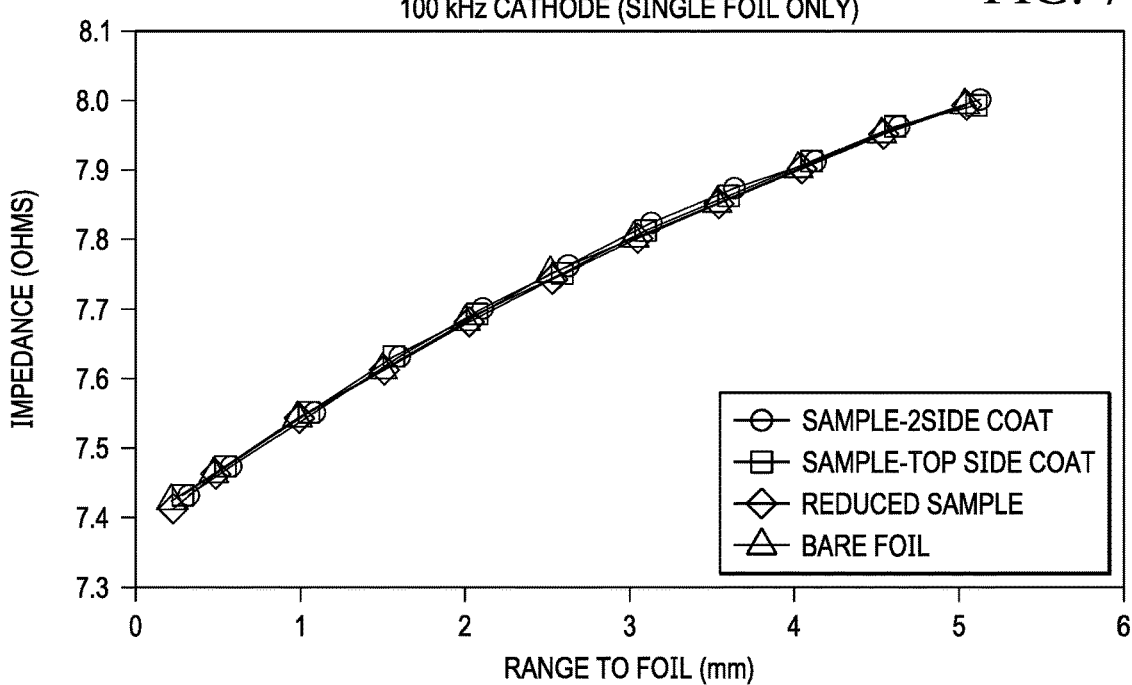
FIG. 7 shows the impedance at 100 kHz for a single foil with differing amounts of cathode coating material using the measurement system shown in FIG. 1.

FIG. 7 shows the impedance measured at 100 kHz for a single foil with differing amounts of cathode coating material thereon using the sensor system 100 shown in FIG. 1. The range measurement to the top surface of the electrode (to the top surface of the top coating 187) was performed by the optical displacement sensor 140. However, because, one does not know how thick the electrode coating is from the optical displacement sensor 140, one obtains the thickness of the electrode coating using the eddy current sensor that enables obtaining the distance to the metal foil.

One metal foil sample was used and the electrode coating was removed for successive measurements. The reduced sample is the coated substrate sample with approximately 10 μm removed from the electrode coating. The surface of the electrode (top of the coating) was measured, but one is generally interested in the distance to the foil. The thickness of the coating was known. For purposes of calibration, one can measure the thickness with a micrometer and subtract the foil thickness which one generally also knows so that thickness was added to the measurement obtained from the optical displacement sensor 140. One generally works in terms of either the distance to the foil or the distance to the electrode surface. The coating thickness is the difference between the two (electrode surface and the metal foil).

One can construct calibration curves of impedance vs the range for the foil and for the coating. The more samples one has, the better the calibration curves will be, especially if the samples span a range covering the expected range that will be produced on the production line. Therefore, for the anode coating layer measurement, it is generally needed to locate a point on the impedance vs. range to electrode coating plot (see FIG. 8 described below) from the coil 120a of the eddy current sensor 120 and optical displacement sensor 140 respectively, and then to calculate the thickness based on distance from the measured calibration curve.

Figure 8:
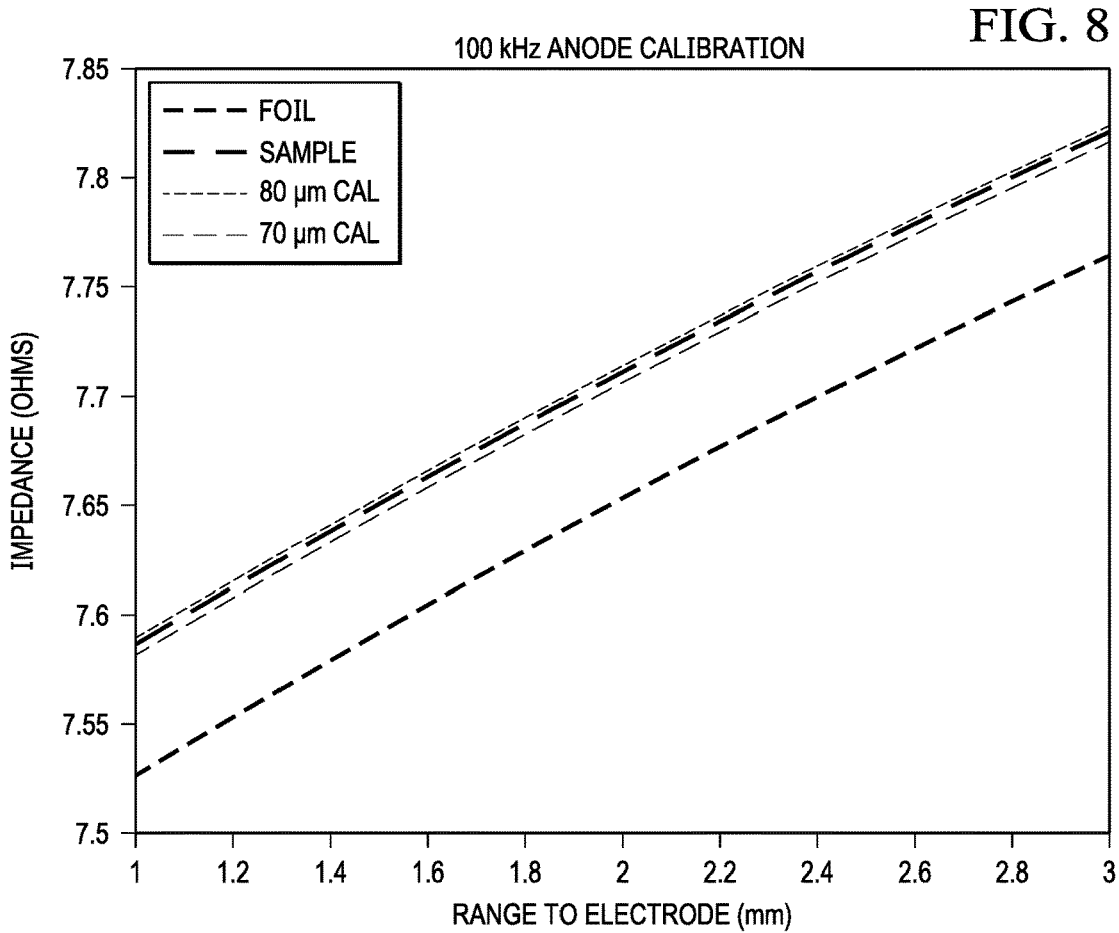
FIG. 8 shows an example of a calibration for an anode coating material that plots impedance versus range to the electrode (in mm).

FIG. 8 shows an example of a calibration for an anode coating material that plots impedance versus range to the electrode (mm). It is noted that FIG. 8 looks different from FIG. 7 described above because FIG. 8 is for an anode and FIG. 7 is for cathode. In FIG. 8 dashed lines are provided showing the response of the foil shown as the foil, and the foil with a 76 μm thick electrode coating shown as being the sample, both being shown bolded. The bolded dashed lines for the response of the foil in the electrode coating are a plot of respective polynomials shown in FIG. 6 described above. There are other dashed lines shown depicting how 70 and 80 μm thick electrode calibration coatings look, shown as 70 μm CAL and 80 μm CAL. The calibration lines are the calculated curves based on inter-/extrapolation of polynomial coefficients as a function of the electrode coating thickness.

As described above, if the metal foil thicknesses varies significantly, then this will also generally be corrected for. One example technique would be to assume that the difference caused by the electrode coating is fixed based on the electrode coating thickness. One could then use a baseline metal foil thickness calibration to derive a relationship for arbitrary metal foil thicknesses and then add the electrode coating difference to this. The coating thickness Pcoat=the total electrode thickness (Pelectrode)–the metal foil thickness (Pfoil). Pfoil will vary depending on the thickness found on the phase diagram, but can be accounted for by making a polynomial for any foil thickness. Then one can make a polynomial representing this foil thickness with the coating using this relationship. See FIG. 4B described above showing how to calculate an arbitrary polynomial given some calibration polynomials.

It is noted that in the anode coating layer measurements there may be a significant sensitivity to electrical conductivity. However, there is a cross sensitivity between electrical conductivity and caliper (thickness). The more the electrode coating is calendered the more electrically conductive will also be. If one needs to correct for electrical conductivity, one has the option of using this technique as described above and estimating the electrical conductivity based on measurements at two different frequencies. This method can also be extended by using a pulsed eddy current method to more accurately determine the thickness and the electrical conductivity of the electrode coating.

It is also noted that the frequencies described above, 100 kHz and 1 MHz are ones which were experimentally found to be useful for making this measurement. Other frequencies may be more useful if the product has different electrical conductivities or thicknesses than those tested. It is also possible that to get the maximum sensitivity one may want to measure the phase at one frequency, say 100 kHz, and the magnitude of the impedance at another frequency, say 1 MHz.

Disclosed aspects can be further extended by considering disclosed measurements are usefully employed in a scanner to determine the CD (cross direction) and MD (machine direction) variations in electrode coating thicknesses. These variations can then be used for caliper control.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A sensor system, comprising:
an eddy current sensor including at least one coil with excitation electronics coupled across the coil;
an optical displacement sensor secured to the eddy current sensor so that a vertical distance between the optical displacement sensor and the eddy current sensor is fixed, and wherein the optical displacement sensor is located on top of and concentric with the coil so that a measurement axis of the optical displacement sensor is collinear with an axis of symmetry of the coil, and
a computing device including a processor and memory coupled to receive sensor data from the eddy current sensor and the optical displacement sensor adapted for analyzing the sensor data obtained when measuring a coated substrate comprising a coating layer comprising an electrically conductive material, on at least one side of a metal substrate to determine at least a thickness of the coating layer.

2. The sensor system of claim 1, wherein the excitation electronics provides a repetitive pulsed current signal to the coil, and wherein the analyzing of the sensor data comprises analyzing a waveform sensed by the eddy current sensor by comparing the sensor data as a received waveform or derived statistics therefrom, to calibration values.

3. The sensor system of claim 2, wherein the excitation electronics is configured to provide the repetitive pulsed current signal at a single frequency, and wherein the analyzing of the sensor data comprises comparing at least one of a voltage across the coil and a phase of the coil to a calculated or measured calibration curve.

4. The sensor system of claim 1, further comprising a scanner including at least one head and a translation mechanism, wherein at least the eddy current sensor and the optical displacement sensor are contained within the at least one head.

5. The sensor system of claim 4, wherein the coating layer includes a top coating layer and a bottom coating layer, and wherein the at least one head includes a top head for measuring a thickness of the top coating layer and a bottom head for measuring a thickness of the bottom coating layer.

6. The sensor system of claim 5, wherein a distance between the optical displacement sensors in the top head and in the bottom head is known, and wherein the analyzing further comprises determining a thickness of the coated substrate and a thickness of the bottom coating layer.

7. The sensor system of claim 1, wherein the eddy current sensor and the optical displacement sensor are both calibrated sensors having sensor calibration data stored in the memory.

* * * * *